(12) United States Patent
Radan et al.

(10) Patent No.: US 10,030,801 B2
(45) Date of Patent: Jul. 24, 2018

(54) DIRECT ELECTRIC HEATING SYSTEM FOR HEATING A SUBSEA PIPELINE

(71) Applicants: Damir Radan, Sandnes (NO); Björn Rasch, Heimdal (NO)

(72) Inventors: Damir Radan, Sandnes (NO); Björn Rasch, Heimdal (NO)

(73) Assignee: Siemens Aktiengesellschaft, München (DE)

( * ) Notice: Subject to any disclaimer, the term of this patent is extended or adjusted under 35 U.S.C. 154(b) by 619 days.

(21) Appl. No.: 14/375,749

(22) PCT Filed: Dec. 5, 2012

(86) PCT No.: PCT/EP2012/074429
§ 371 (c)(1),
(2) Date: Jul. 30, 2014

(87) PCT Pub. No.: WO2013/113430
PCT Pub. Date: Aug. 8, 2013

(65) Prior Publication Data
US 2015/0016812 A1 Jan. 15, 2015

(30) Foreign Application Priority Data

Jan. 31, 2012 (EP) .................................... 12153321

(51) Int. Cl.
*F16L 53/00* (2018.01)
*E21B 36/04* (2006.01)
(Continued)

(52) U.S. Cl.
CPC ............ *F16L 53/007* (2013.01); *E21B 36/04* (2013.01); *F16L 53/37* (2018.01); *H02J 3/18* (2013.01);
(Continued)

(58) Field of Classification Search
CPC . F16L 53/007; E21B 36/04; H02J 3/18; H02J 3/26
(Continued)

(56) References Cited

U.S. PATENT DOCUMENTS 3,265,958 A    8/1966  Walter
5,672,957 A *  9/1997  Bergmann ................ H02J 3/18
                                                  323/210
(Continued)

FOREIGN PATENT DOCUMENTS

CN    102160251 A     8/2011
DE    1060068         6/1959
(Continued)

OTHER PUBLICATIONS

Chinese Office Action for Chinese Patent Application No. 201280068622.7, dated Nov. 4, 2015, with English Translation.
(Continued)

*Primary Examiner* — David Angwin
*Assistant Examiner* — Justin Dodson
(74) *Attorney, Agent, or Firm* — Lempia Summerfield Katz LLC

(57) ABSTRACT

A direct electric heating (DEH) system for heating a subsea pipeline is provided. The DEH system includes a subsea power cable adapted to be coupled to a three phase electric power source. The DEH system further includes two or more subsea DEH modules. Each subsea module of the two or more subsea DEH modules is provided for heating a different pipeline section of the subsea pipeline.

19 Claims, 5 Drawing Sheets

(51) Int. Cl.
 *H02J 3/18* (2006.01)
 *F16L 53/37* (2018.01)
 *H02J 3/26* (2006.01)

(52) U.S. Cl.
 CPC ............... *H02J 3/26* (2013.01); *Y02E 40/30* (2013.01); *Y02E 40/50* (2013.01)

(58) Field of Classification Search
 USPC ........................................ 392/478, 479, 480
 See application file for complete search history.

(56) References Cited

U.S. PATENT DOCUMENTS

| | | | |
|---|---|---|---|
| 6,142,707 | A | 11/2000 | Bass et al. |
| 2006/0062029 | A1 | 3/2006 | Arnold |
| 2008/0236810 | A1* | 10/2008 | Bornes .................... E21B 43/01 166/61 |
| 2011/0156691 | A1* | 6/2011 | Radan ..................... H02M 5/14 323/358 |

FOREIGN PATENT DOCUMENTS

| | | |
|---|---|---|
| EP | 2166637 A1 | 3/2010 |
| JP | 63-93456 A | 4/1988 |
| WO | 2004111519 A1 | 12/2004 |
| WO | 2007011230 A1 | 1/2007 |
| WO | 2010031626 A1 | 3/2010 |

OTHER PUBLICATIONS

European Search Report in corresponding European Patent Application No. 12 15 3321.0, dated Mar. 10, 2012, 7 pages.
International Search Report and Written Opinion in corresponding PCT Application No. PCT/EP2012/074429, dated Feb. 12, 2014, 11 pages.

* cited by examiner

DIRECT ELECTRIC HEATING SYSTEM FOR HEATING A SUBSEA PIPELINE

This application is the National Stage of International Application No. PCT/EP2012/074429, filed Dec. 5, 2012, which claims the benefit of European Patent Application No. EP 12153321.0, filed Jan. 31, 2012. The entire contents of these documents are hereby incorporated herein by reference.

FIELD

The present embodiments relate to a direct electric heating system for heating a subsea pipeline.

BACKGROUND

Recently, there has been an increasing interest in offshore hydrocarbon production. Hydrocarbon wells may be located many miles from shore sites and in water depths reaching down to several thousand meters. Subsea pipelines may be used for transporting hydrocarbons from an offshore well to a production vessel or to an onshore site, or may be used for transporting hydrocarbons between different onshore sites separated by an offshore section.

In deep waters, the water temperature is relatively low. The water temperature may, for example, be between about −1 and +4° C. When hydrocarbons are produced from a subsea well, the hydrocarbons may include a fraction of water, and the hydrocarbons will cool significantly upon reaching the seabed. This may lead to the formation of hydrates that may be a combination of pressurized hydrocarbon gas with water. This combination may, at low temperatures, form a hydrate that is a solid material. Hydrates may restrict the flow within a pipeline, or may even completely plug the pipeline.

Methods that use chemicals for preventing hydrate formation are known in the art. Another method that is more effective is the increase of the temperature of the pipeline, for example, by using direct electric heating (DEH). Such DEH system is, for example, known from WO 2004/111519, which uses a subsea single phase cable that is attached to two sides of a steel pipeline. A 50/60 Hz AC current is passed through the cable and the pipeline, and the pipeline is heated due to electric resistance.

The power source may be located at an onsite location or on board of a production vessel, and an example of such power source is described in WO 2010/031626. The pipeline section to be heated is a single phase load on the power supply arrangement.

The problem of conventional systems is that the conventional systems are generally restricted to rather short distances between the pipeline section to be heated and the power supply. Also, the length of the pipeline to be heated is only very limited. Long step-out distances may thus generally not be realized. Such systems may lack any way of controlling the heating. Also, there are significant losses of electric energy along the subsea cable to the pipeline, and the subsea cable itself is a very cost intensive product.

It is desirable to enable the heating of pipeline sections located further away from the main power supply and the heating of longer pipeline sections. It is desirable to reduce currents in the cable supplying the electric power to the pipeline section to be heated, and to provide a fault tolerant heating system. Also, the costs involved in such system should be reduced, and the efficiency should be increased.

SUMMARY AND DESCRIPTION

There is a need to obviate at least some of the drawbacks mentioned above and to provide an improved direct electric heating system for the heating of subsea pipelines. One or more of the present embodiments obviate at least some of the drawbacks and provide an improved direct electric heating system for the heating of subsea pipelines.

An embodiment provides a direct electric heating system for heating a subsea pipeline including a subsea power cable adapted to be coupled to a three phase electric power source for providing three phase electric power to a subsea location and two or more subsea direct electric heating (DEH) modules. Each module of the two or more subsea DEH modules is provided for heating a different pipeline section of the subsea pipeline. The subsea DEH modules are adapted to be installed subsea at different subsea locations (e.g., in proximity to the pipeline section to be heated by the respective subsea DEH module).

Each subsea DEH module includes a three phase transformer, and first electric connections adapted to couple the three phase transformer of the subsea DEH module to the subsea power cable for supplying three phase electric power to the three phase transformer. Each subsea DEH module also includes second electric connections adapted to couple the subsea DEH module to the respective pipeline section for providing electric power to the pipeline section for heating the pipeline section, and a symmetrisation unit coupled between the three phase transformer and the second electric connections. The symmetrisation unit is adapted to distribute the electric load of the pipeline section evenly between three phases of an output of the three phase transformer, so as to achieve a balanced three phase load on the three phase power source.

By making use of two or more subsea DEH modules each heating a different pipeline section, the total length of pipeline that may be heated by the DEH system may be increased. For example, the modular approach may allow an adaptation of the DEH system to the particular subsea pipeline length. Further, since a three phase electric power is transmitted, longer step-out distances may be realized. At the same time, the cost of the subsea power cable may be kept relatively low, and an effective transmission of the electric power may be realized. The material used for the conductors of the subsea power cable may, for example, be significantly reduced compared to single phase systems.

The subsea power cable may be adapted to distribute the three phase electric power to the different locations of the DEH modules, and may accordingly also be termed subsea power distribution cable. Different pipeline sections may thus be heated in an efficient manner. By balancing the load on the three phases (e.g., by providing a symmetric load), imbalance currents may be reduced or even avoided (e.g., negative sequence currents may be reduced). This may allow a smaller dimensioning of components of the DEH system and may prevent failure of and damage to connected components (e.g., of the three phase power source).

In an embodiment, each subsea DEH module may be adapted to heat the respective pipeline section by single phase electric power. The pipeline section may thus constitute a single phase load for the respective DEH module. The second electric connections may include an electric connection from an output of the symmetrisation unit to one end of the respective pipeline section and an electric connection from the output of the symmetrisation unit to the other end of the pipeline section.

As an example, the pipeline section may be coupled between a first phase and a third phase of the three phase power source, and the symmetrisation unit may include a capacitance coupled between the first phase and a second phase of the power source, and an inductance coupled between the second phase and the third phase of the power source. A simple and effective way of balancing the load on the three phases may thus be realized.

The capacitance and/or the inductance may be adapted to be adjustable. For example, the capacitance and/or the inductance may be adjustable on load so that the symmetrisation may be performed while the DEH system is in operation (e.g., for accounting for changes in the impedance of the respective pipeline section). The capacitance and/or the inductance may be adjustable in accordance with control signal, so that the respective value may be controlled (e.g., by a feedback circuit of the subsea DEH module or from a remote location, such as a topside installation).

The capacitance of the symmetrisation unit may include two or more capacitors that are connected in parallel and may further include switches for connecting and disconnecting the capacitors. The switches may be controllable in accordance with control signals for adjusting the value of the capacitance. The value may, for example, be increased by connecting further capacitors in parallel or may be decreased by disconnecting capacitors. The capacitance may be implemented by a capacitor bank.

The three phase transformers may have a three phase input (e.g., primary side) coupled to the three phases of the electric power source, and a three phase output (e.g., secondary side) that is coupled to the symmetrisation unit. The three phase transformer may be configured to be adjustable, so that the heating of each connected pipeline section may be regulated individually.

The three phase transformer may include an on-load tap changer. The three phase transformer is thus controllable for adjusting the level of the voltage supplied to the second electric connections (e.g., to the pipeline section to be heated). For example, the three phase transformer may be adapted to step down the voltage supplied by the subsea power cable to the subsea DEH module. Heating may thus be controlled in accordance with the length of the pipeline section, while a higher voltage may be used for transmission of the electric power over a long step-out distance to the subsea location. The DEH system may, for example, be adapted to supply a voltage of between about 100 kV to each subsea DEH module, and the transformer may be adapted to transform this voltage down to a voltage in the range of about 5 kV to about 50 kV (e.g., of about 10 kV to about 40 kV). For example, a voltage between 20 kV and 30 kV (e.g., 26 kV) may be provided to the pipeline section. The tap changer may be on the high voltage side of the three phase transformer.

In an embodiment, each DEH module includes a compensation unit adapted to compensate for reactive power arising from the heating of the respective pipeline section. As an example, the impedance of the pipeline section may include resistive and inductive components, and the single phase load in form of the pipeline section may accordingly lead to reduced power factor. The compensation unit may be adapted to compensate for this reduced power factor (e.g., the compensation unit may increase the power factor towards a value of one).

The compensation unit may include a capacitance. The value of the capacitance may be controlled, for example, in accordance with a control signal. The compensation unit may be adapted to allow an on-load control of the capacitance value. Again the capacitance may be implemented by a capacitor bank. The capacitance of the compensation may thus include two or more capacitors being connected in parallel. The capacitance may further include switches for connecting or disconnecting the capacitors. The switches are controllable in accordance with the control signal for adjusting the value of the capacitance.

The compensation unit may be connected in parallel with the single phase load (e.g., in parallel with the respective pipeline section). The compensation unit may, for example, be connected between the first phase and the third phase of the three phase power source. The compensation unit may also be connected between the symmetrisation unit and the pipeline section.

In an embodiment, the DEH module further includes a compensation reactor adapted to compensate for reactive power arising from a capacitance of the subsea cable. For different lengths of the subsea power cable, the subsea cable capacitance may change, and accordingly, the power factor may be reduced. The compensation reactor may compensate for the reduced power factor (e.g., the compensation reactor may again increase the power factor). Accordingly, currents in the subsea power cable that are due to reactive power may be reduced or even minimized.

The compensation reactor may include a coil having an inductance, and a value of the inductance may be adjustable in accordance with a control signal. The coil may, for example, include a tap changer for changing the inductance value. In other implementations, the coil may, for example, include an adjustable gap in a magnetic core, or another device for adjusting the inductance.

The compensation reactor may be provided for each phase of the three phase power source. The compensation reactor may be connected to the input of the three phase transformer (e.g., between the first electric connections and the three phase transformer).

Accordingly, the compensation of reactive power may be adjusted for different lengths of the subsea power cable. Further, the compensation reactor in each subsea DEH module may be switched on or off when needed (e.g., for compensating additional cable length).

In an embodiment, each subsea DEH module may further include a three phase circuit breaker adapted to disconnect the subsea DEH module from the three phase powers source. The three phase circuit breaker may be controllable by a control signal, which may be generated locally (e.g., by a detection circuit upon detection of a failure or fault) or may be provided from a topside installation (e.g., for disconnecting the respective subsea DEH module from the subsea power cable). This may, for example, be beneficial during service operations, where a single pipeline section may be disconnected from the DEH system while other pipeline section may remain heated.

In an embodiment, the subsea power cable is coupled to the three phase power source at a topside installation, and the DEH system further includes a topside compensation reactor connected to the subsea power cable at the topside installation. The topside compensation reactor is adapted to compensate for reactive power arising from a capacitance of the subsea power cable. Again, currents in the subsea power cable that are due to reactive power may be reduced or minimized. The compensation of reactive power may be made efficient if a topside compensation reactor is used together with compensation reactors provided locally at each subsea DEH module.

The three phase power source at the topside installation may be a generator or a generator set, or the three phase power source may be a connection to a power grid.

In a further embodiment, the subsea power cable is coupled to the three phase power source at a topside installation, and the DEH system further includes a topside three phase transformer at the topside installation. The topside three phase transformer is connected between the three phase power source and the subsea power cable for transforming the voltage supplied by the three phase power source to a higher voltage level. In such configuration, higher step-out distances may be achieved, as the losses due to the transmission of the electric power may be reduced when using a higher voltage level. Step-out distances in excess of 100 km may thus be achieved.

In an embodiment, the subsea power cable is coupled to the three phase power source at the topside installation, and the DEH system may further include a topside variable frequency drive (VFD) at the topside installation for adjusting the frequency and/or voltage of the three phase electric power supplied by the three phase power source. The topside VFD may be connected between the three phase power source and the subsea power cable (e.g., before a topside three phase transformer) if such is present in the system. By adjusting the frequency of the electric power distributed by the subsea power cable, the power distribution and transmission may be made more effective, and losses may be reduced.

The subsea power cable may include a three core-cable. Each core of the three core-cable supplies a phase of the three phase electric power to the subsea DEH modules. Such configuration may facilitate the deployment of the subsea power cable and may also be more cost efficient. In other embodiments, the subsea power cable may include three single-phase subsea power cables (e.g., single core cables) for supplying the electric power to the subsea DEH modules.

The subsea power cable may have a length of at least 50 km (e.g., of at least 75 km or even at least 100 km). Long step-out distances may be realized using such subsea power cable.

In an embodiment, the DEH system may further include feeder connection points located along the subsea power cable. The first electric connection may be implemented by a three phase cable connected between the subsea DEH module and the respective feeder connection point of the subsea power cable. Accordingly, a simple and effective distribution of the electric power to the different subsea DEH modules may be achieved.

In an embodiment, each subsea DEH module may further include a communication interface towards a topside installation for receiving control signals from the topside installation. Using the control signals, the above mentioned symmetrisation unit, the three phase transformer, the compensation unit, the compensation reactor, the three phase circuit breaker, or any combination thereof may be controlled.

The subsea DEH module may include a control unit that is adapted to automatically control values of components of the before mentioned units in accordance with control signals received via the communication interface from the topside installation. The control unit may also automatically control the components (e.g., by the above mentioned control signals). This may, for example, be achieved by a feedback circuit or the like included in such control unit.

The three phase power source may, at the topside installation, supply the three phase electric power with a voltage of about 5-50 kV (e.g., between about 10 kV and 20 kV).

Accordingly, any number of pipeline sections may be heated from a single three phase subsea power cable, and the voltage and the heating power may be regulated on each pipeline section individually.

Each subsea DEH module may include a subsea enclosure adapted to enable the installation of the subsea DEH module in water depths of at least 50 m (e.g., at least 100 m, 500*m* or even 1000 m). As an example, a pipeline to a well located at about 3000 m water depth may be heated by such subsea DEH modules.

The different pipeline sections may each include between about 1 and about 10 pipeline segments (e.g., between about 1 and about 4 pipeline segments). The pipeline sections may be adjoining sections of the subsea pipeline. Two subsea DEH modules may be installed at the same location (e.g., at a joint between adjacent pipeline sections).

The features mentioned above and those yet to be explained below may be used not only in the respective combinations indicated, but also in other combinations or in isolation, without leaving the scope of the present invention. For example, the features of the embodiments described above and those described hereinafter may be combined with each other unless noted to the contrary.

BRIEF DESCRIPTION OF THE DRAWINGS

In the drawings, like reference numerals refer to like elements.

DETAILED DESCRIPTION

Figure 1:
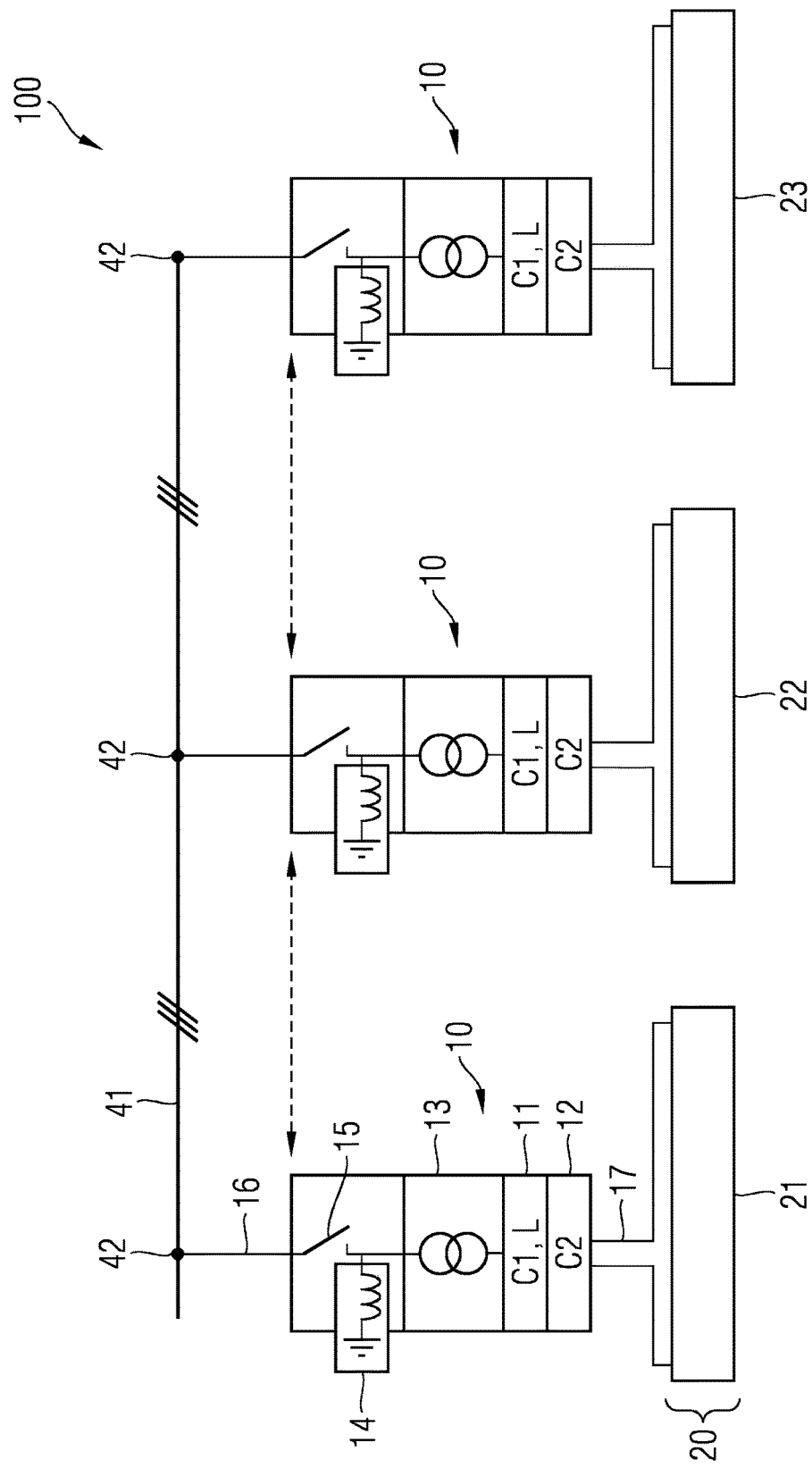
FIG. 1 is a schematic block diagram showing a DEH system in accordance with an embodiment.

In the following, embodiments will be described in detail with reference to the accompanying drawings. The following description of embodiments is given only for the purpose of illustration and is not to be taken in a limiting sense.

The drawings are to be regarded as being schematic representations only, and elements in the drawings are not necessarily to scale with each other. Also, the coupling of physical or functional units as shown in the drawings and described hereinafter may not be a direct connection or coupling, but may also be an indirect connection or coupling (e.g., a connection or a coupling with one or more additional intervening elements). The physical or functional units illustrated and described herein with respect to the different embodiments may not be implemented as physically separate units. One or more physical or functional blocks or units may be implemented in a common circuit, circuit element or unit, while other physical or functional blocks or units shown may be implemented in separate circuits, circuit elements or units.

FIG. 1 schematically illustrates one embodiment of a direct electric heating (DEH) system 100 that is adapted to heat pipeline sections 21, 22, 23 of a subsea pipeline 20. The DEH system 100 includes plural subsea DEH modules 10. Each subsea DEH module 10 includes electric connections 16 by which the subsea DEH module 10 is electrically coupled to feeder connection points 42 of a subsea power cable 41. The subsea power cable 41 is at a topside installation coupled to a three phase power source (e.g., AC electric power). The subsea power cable 41 is used to transmit three phase electric power from the power source to the individual subsea DEH modules 10. Using the plural feeder connections points 42, the subsea power cable 41 thus provides a power distribution functionality. The subsea power cable 41 may be a three core cable, or the subsea power cable 41 may include three or more single core cables. The subsea power cable 41 is adapted for the transmission of electric power having a voltage range in between about 100 kV and about 200 kV. In other implementations, a lower voltage may be used for transmission (e.g., between about 10 kV and about 100 kV), depending on the particular application. Subsea power cable 41 may be adapted for being used in water depths down to several hundreds or even several thousands of meters. The subsea power cable 41 may be pressure compensated.

Electric connections 16 may be three phase feeder connections (e.g., employing three core subsea power cables). By these electric connections 16, each DEH module 10 is supplied with three phase electric power. Three phase electric power implies alternating current (AC) electric power, with the voltage waveform of the three different phases having, for example, a phase shift of about 120 degrees.

The subsea DEH module 10 includes a three phase circuit breaker 15 (e.g., a circuit breaker is provided for each phase of the supplied electric power). Accordingly, the subsea DEH module 10 may be decoupled from the subsea power cable 41. This may be provided in case of a fault on the connected pipeline section or in the subsea DEH module 10, or simply for switching off the heating of the connected pipeline section.

Subsea DEH module 10 further includes a three phase transformer 13 that is coupled to the electric power source via the circuit breaker 15. The transformer 13 may step down the voltage supplied to the subsea DEH module 10. For example, the transformer 13 may step down the power transmission voltage, which may be in the range of 100 kV to 200 kV, to a voltage suitable for heating the connected pipeline section (e.g., a stepped down voltage). The stepped down voltage may depend on the length and the resistance of the pipeline section to be heated, so the stepped down voltage may, for example, be set within the range of about 5 kV to about 50 kV (e.g., to 26 kV). To account for different pipeline sections and for changes in the impedance of a connected pipeline section, transformer 13 may be adapted so that an output voltage of the transformer 13 is adjustable. Further the transformer 13 may be made adjustable for controlling the voltage applied to the pipeline section and the amount of heating of the pipeline section (e.g., to control the heating load).

For this purpose, the transformer 13 may be equipped with a tap changer (e.g., on a primary side; on the high voltage side). This may be an on-load tap changer so that the output voltage is adjustable during operation. Accordingly, by making use of transformer 13, the different pipeline sections 21, 22, 23 may be heated individually, under control of the respective subsea DEH module 10.

The subsea DEH module 10 further includes electric connections 17 for connecting to a load. The electric connections 17 correspond to the output of subsea DEH module 10 since electric power for heating the respective pipeline section is given out via these connections. The load is a single phase load. For example, the load is the pipeline section (e.g., pipeline section 21). The electric connections 17 may include a first cable to one end of the pipeline section and a second cable to the other end of the pipeline section. An AC voltage provided at the electric connections 17 will consequently result in an AC current flowing through the connected pipeline section. The pipeline section is made of a conductive material that has an impedance including a resistive component. Accordingly, due to the resistance, the electric current through the pipeline section will result in the heating of the pipeline section.

In other embodiments, the electric connections 17 may include only a single cable to one end of the pipeline section and an earth return for the other end of the pipeline section. Other implementations may also be provided.

The subsea DEH module 10 further includes a symmetrisation unit 11 that is coupled between the output of transformer 13 and the electric connections 17. The symmetrisation unit 11 is adapted to transfer the single phase load constituted by pipeline section 21 to a three phase load on the output of transformer 13, and thus on the three phase power source that supplies electric power to transformer 13. The symmetrisation unit 11 is adapted to distribute the single phase load evenly on the three phases of the power source (e.g., to transform the single phase load to a symmetric load on the three phases). The load on the three phases of the output of transformer 13 and thus on the three phases of the power source is thus balanced. Accordingly, imbalance currents or negative sequence currents may be reduced or even be minimized. With the proper tuning of symmetrisation unit 11, negative sequence currents may almost be completely avoided.

The subsea DEH module 10 further includes a compensation unit 17. The compensation unit 17 is connected between the single phase output of the symmetrisation unit 11 and the electric connections 17. For example, the compensation unit 17 includes an electric component connected in parallel to the single phase load (e.g., pipeline section 21).

The compensation unit 12 is adapted to compensate for reactive power arising from the single phase load 21. The impedance of the pipeline section 21 may include an inductive component, and the inductive component may thus be said to 'consume' reactive power, which would lead to corresponding currents in the DEH system 100. Accordingly, a low power factor results from the pipeline section 21. The compensation unit 17 may be configured to generate a corresponding amount of reactive power (e.g., by a capacitive component), thus bringing the power factor back towards one. Currents in the DEH system 100 due to reactive power may thus be reduced or minimized. Consequently, the components of the DEH system 100, such as the subsea power cable 41, may be dimensioned for lower currents, resulting in reduced complexity and costs.

The subsea DEH module 10 further includes a compensation reactor 14 that may also be termed subsea compensation reactor since the compensation reactor 14 is installed in the subsea DEH module 10. The compensation reactor 14 is connected between the circuit breaker 15 and the transformer 13. The compensation reactor 14 is further connected to ground. The compensation reactor 14 is adapted to compensate for reactive power arising from the subsea power cable 41 (e.g., from a capacitive component of the subsea power cable 41).

Again, the capacitive component of subsea power cable 41 may generate reactive power, resulting in a lower power factor. The compensation reactor 14 may include an inductive component (e.g., a coil or the like) for "consuming" reactive power and thus for compensating the reactive power generated by the capacitive component. The reactive power due to the subsea power cable 41 may thus be reduced or even minimized.

The inductance of the compensation reactor 14 may be adjustable. As an example, the compensation reactor 14 may include a coil having a tap changer for providing different inductance values, or having an adjustable core, such as a magnetic core having an adjustable gap. The inductance of compensation reactor 14 may thus be adjusted for different lengths of the subsea power cable 41. This may be done automatically (e.g., by a feedback circuit taking measurements and adjusting the inductance accordingly). Adjustment may also occur in accordance with a control signal received from a topside installation. Again, this may be performed automatically, with the topside installation obtaining measurements indicative of the reactive power in DEH system 100, and adjusting the inductance to reduce the reactive power.

Figure 2:
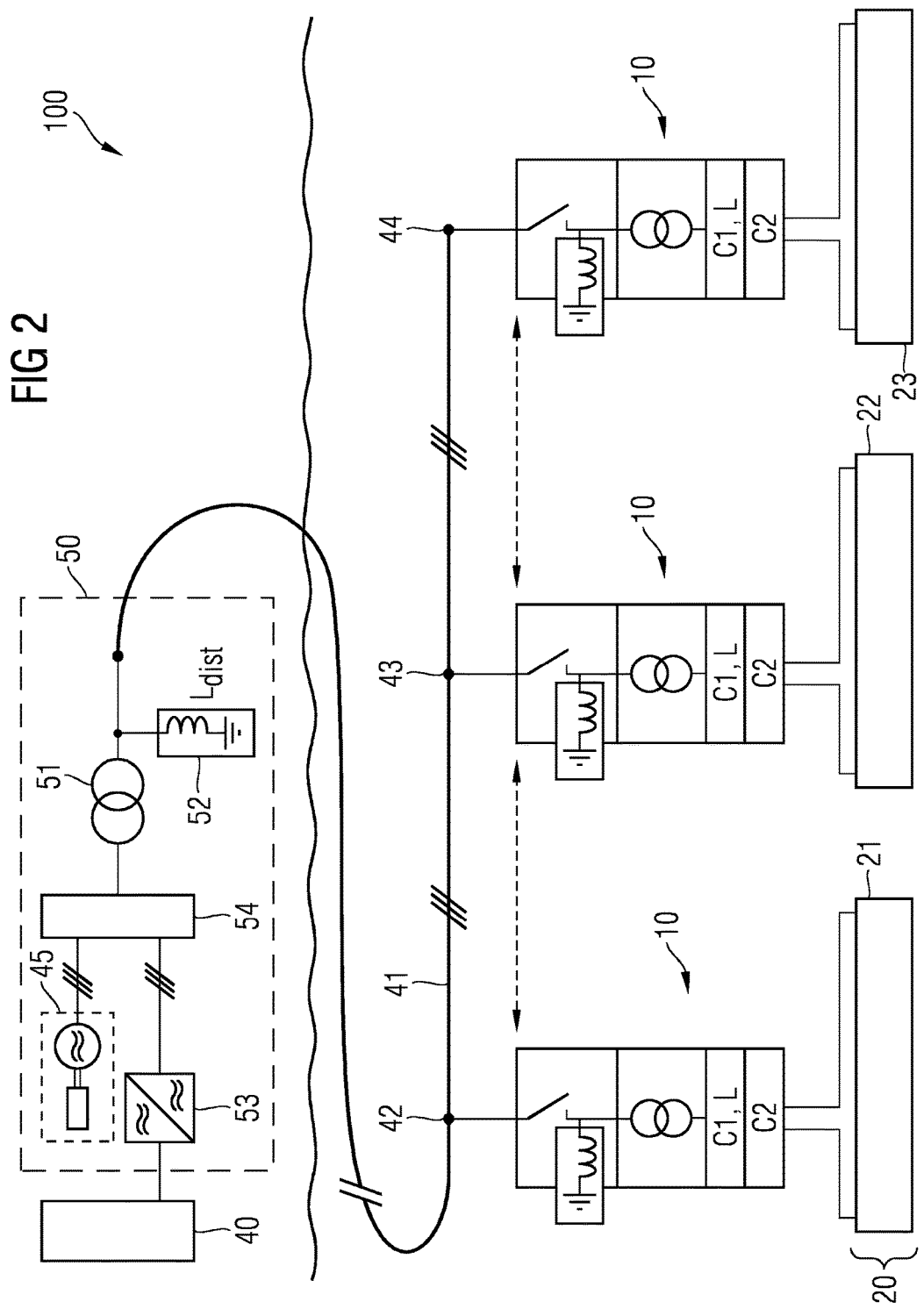
FIG. 2 is a schematic block diagram showing the DEH system of FIG. 1 including further components at a topside installation in accordance with an embodiment.

FIG. 2 shows one embodiment of the DEH system 100 coupled to the topside installation 50. The topside installation may be located onboard of a vessel (e.g., a ship or a floating platform, such as a semi-submersible), onboard of a fixed platform (offshore platform), or at an onshore site (e.g., an onshore production facility).

The three phase power source may be a main power supply of the topside installation 50. The three phase power source may, for example, be a generator or generator set 45 (e.g., coupled to a prime mover, such as a diesel engine or a gas turbine), a power grid 40, or a combination thereof.

The DEH system 100 may, at the topside installation, further include a topside transformer 51. The topside transformer 51 changes the voltage level of the electric power supplied by the power source 40, 45 to a level that is suitable for transmission. For long step out distances (e.g., for long length of subsea power cable 41), a higher voltage may be used for power transmission to minimize losses. The subsea power cable 41 may have a length of more than 100 km. Accordingly, the topside transformer may convert the electric energy to a voltage in the range between about 100 kV and about 200 kV for transmission (e.g., 120 kV to 150 kV). The voltage supplied by the power source 40, 45 may be in a range between about 5 kV and 50 kV (e.g., at about 11 kV). The configuration thus enables increased step out distances. Due to the three phase power transmission, the material required for the subsea power cable 41 may further be reduced.

The DEH system 100 may at the topside installation 50 further include a topside compensation reactor 52. The topside compensation reactor 52 is connected to the output of the topside transformer 51. Similar to the subsea compensation reactor 14, the topside compensation reactor 52 is adapted to compensate for reactive power arising from a capacitive component of the subsea power cable 41. The topside compensation reactor 52 includes an inductance $L_{dist}$ for increasing the power factor (e.g., for bringing the power factor back towards a value of one). The inductance may be implemented as a coil coupled between the output of topside transformer 51 and ground.

The inductance of the topside compensation reactor 52 may be adjustable. As an example, the inductance of the topside compensation reactor 52 may be implemented as a coil having a tap changer for providing different inductance values, a coil having an adjustable core, such as a magnetic core having an adjustable gap. The inductance of topside compensation reactor 52 may thus be adjusted for different lengths of the subsea power cable 41. This may be done automatically (e.g., by a feedback circuit taking measurements and adjusting the inductance accordingly). The topside installation may, for example, take measurements indicative of the reactive power in DEH system 100, and adjust the inductance of the topside compensation reactor 52 to reduce the reactive power. A manual adjustment may also be provided (e.g., when the length of the subsea power cable 41 is changed). The compensation reactors 14, 52 are coupled to each of the three phases of the system for compensating reactive power for each phase.

By both having a topside compensation reactor 52 and having subsea compensation reactors 14 within each subsea DEH module 10, a good compensation of reactive power may be achieved. Other embodiments may only include a topside compensation reactor 52, only subsea compensation reactors 14, or none of both to reduce the complexity and cost of the DEH system 100.

The DEH system 100 may further include a variable frequency drive (VFD) 53 at the topside installation 50 for changing the frequency and/or voltage of the three phase electric power supplied by the power source. The VFD 53 may, for example, be connected after a power grid 40 for adjusting the frequency for power transmission via the subsea power cable 41. A higher frequency may, for example, be beneficial for longer step-out distances.

The topside installation may also include a power distribution unit 54 that may be implemented by a switchboard, a bus bar system or the like.

In the schematic representation of FIG. 2, the curved line represents the water surface separating the upper topside part from the lower subsea part of the DEH system 100.

Each of the subsea DEH modules 10 of FIG. 2 may be configured as described above with respect to FIG. 1.

Figure 3:
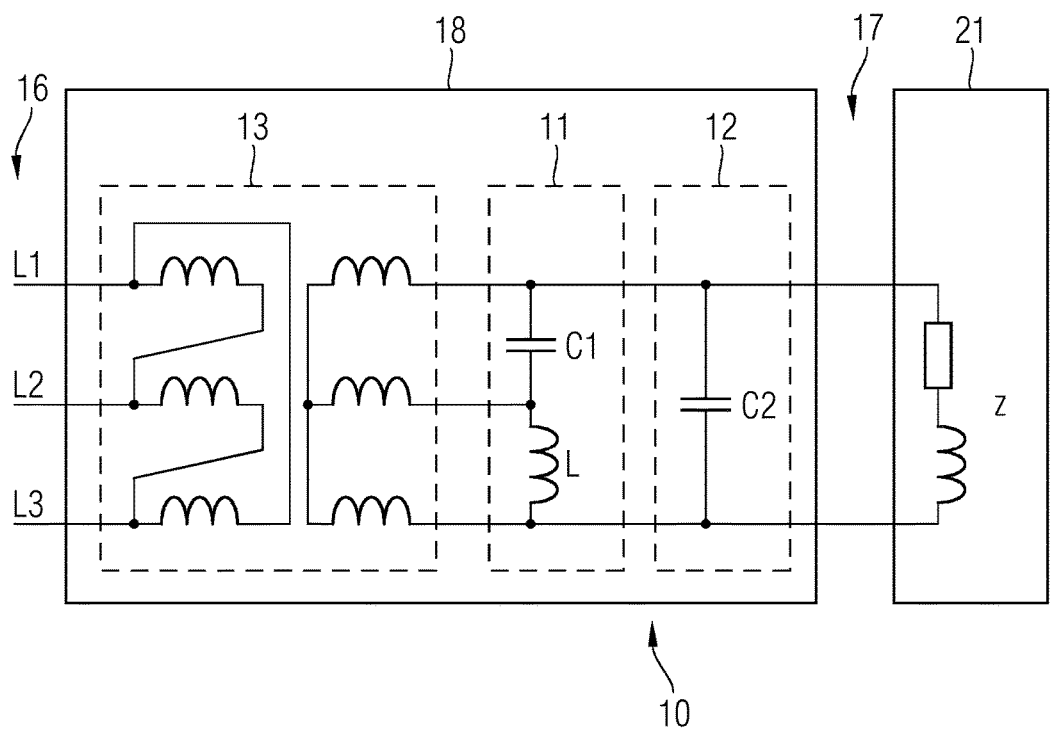
FIG. 3 is a schematic block diagram showing the details of a subsea DEH module in accordance with an embodiment.

FIG. 3 schematically shows an embodiment of a subsea DEH module 10, which may be used in the DEH system 100 of FIGS. 1 and 2. The subsea DEH module 10 includes the electric connections 16, by which the subsea DEH module 10 is coupled to the feeder point 42 of the subsea power cable 41. The electric connections 16 include a connection for the first phase L1, a connection for the second phase L2 and a connection for the third phase L3 of the three phase power source. The electric connections 16 may be implemented by a three core subsea cable (e.g., a jumper cable or the like). The subsea DEH module 10 includes an enclosure 18, to which a connector (e.g., a wet mateable connector) may be mounted for connecting to such jumper cable. Accordingly, the module 10 may be disconnected and removed for servicing without the need to retrieve the subsea power cable 41.

The enclosure 18 may be a pressure resistant subsea enclosure that maintains an inside pressure of close to one atmosphere when subsea DEH module 10 is installed subsea. Accordingly, standard electric components may be employed. In other configurations, the enclosure 18 may be a pressure compensated enclosure filled with a dielectric liquid, in which a pressure corresponding to the pressure outside the subsea DEH module 10 prevails. The enclosure 18 may then be constructed more compact and lightweight. The enclosure 18 may be adapted so that the subsea DEH module 10 may be installed and operated at water depths of more than 100 m, more than 500 m or even more than 1000 m.

FIG. 3 shows a possible implementation of the three phase transformer 13. The transformer 13 may be provided with a tap changer (not shown) (e.g., an on-load tap changer). The tap changer may be installed on the high voltage side.

The symmetrisation unit 11 has the three phases L1, L2 and L3 as an input (e.g., after transformation by transformer 13), and has two outputs for connecting a single phase load (e.g., pipeline section 21). The single phase load is connected between phases L1 and L2. For distributing the single phase load evenly on the three phases L1, L2, L3, the symmetrisation unit 11 includes a capacitance C1 connected between the phases L1 and L2, and an inductance L connected between the phases L2 and L3. By a proper selection of the values of the capacitance C1 and the inductance L, a load balancing may be achieved on the three phases. As a result, imbalance currents may be reduced or even avoided.

Capacitance C1 may be implemented as a capacitor bank. The capacitance C1 may be adjustable (e.g., in accordance with a control signal). Capacitance C1 may, for example, include plural capacitors connected in parallel. The capacitors are connectable and disconnectable by electronically controlled switches. Thus, the value of capacitance C1 may be adjusted.

The inductance L may include a coil or the like. The inductance L may be adjustable. Inductance L may, for example, include a tap changer that allows the setting of different inductance values in accordance with a control signal. Other implementations include a coil with an adjustable core (e.g., a magnetic core, the gap of which is adjustable).

The subsea DEH module 10 may, for example, include a control unit (not shown) that adjusts the values of C1 and L in accordance with the current single phase load constituted by pipeline section 21. Accordingly, even if the impedance Z, which may include resistive and inductive components (as illustrated), changes, the load may be balanced on the three phases L1, L2 and L3. The control unit may thus implement a local feedback circuit. In other implementations, such control unit may receive a control signal from the topside installation for changing the value of C1 and/or L.

The compensation unit 12 includes a capacitance C2 that is connected in parallel with the single phase load 21. The capacitance C2 may be implemented as described above with respect to C1. For example, a value of the capacitance C2 may be adjustable in accordance with a control signal received from a topside installation or from a local control unit. The value of the capacitance C2 is set so that reactive power caused by the single phase load 21 is compensated. If the amount of reactive power changes, C2 may be adjusted dynamically for compensating for such changes. In other implementations, the value of the capacitance C2 may be preset for a particular pipeline section to be heated by subsea DEH module 10.

The electric connections 17 couple the output (e.g., single phase output) of subsea DEH module 10 to the single phase load (e.g., to pipeline section 21). The pipeline section 21 may have connectors for receiving corresponding connectors of the electric connections 17 at both ends of the pipeline section 21. Accordingly, a current may flow through the pipeline section 21, the impedance Z of which causes the pipeline section to be heated. By adjusting the voltage at the output of subsea DEH module 10 using transformer 13, the current through the pipeline section 21 and thus the amount of heating may be adjusted.

The subsea DEH module 10 may further include the above mentioned components, such as the circuit breaker 15 or the compensation reactor 14. In other implementations, some components may be omitted (e.g., the compensation unit 12 or the transformer 13).

The subsea DEH module 10 may further include a communication interface (not shown) for communication with the topside installation 50. Communication may occur by a separate communication line, which may be provided within subsea power cable 41 (e.g., a fiber optic cable), by power line communication using a conductor of the subsea power cable 41, or in any other way. Accordingly, measurements taken at the subsea DEH module 10 may be reported to topside installation 50, and control signals issued at topside installation 50 may be received at the subsea DEH module 10. Using such control signals, one or any combination of the symmetrisation unit 11, the compensation unit 12, the transformer 13, the compensation reactor 14 and the circuit breaker 15 may be controlled.

A distance between individual subsea DEH modules 10 or between the feeder connections points 42 may be up to about 100 km (e.g., between 10 km and 80 km), depending on the configuration. For example, a plurality of subsea DEH modules may be fed from a single subsea power cable having a distance of more than 30 km in between them. Also, depending on the particular requirements, the step-out distance from the topside installation to the first feeder connection point 42 may be more than 50 km or even more than 100 km. This may be achieved by using the power transmission in the high voltage range and using a three phase electric power transmission.

Although three subsea DEH modules 10 are shown in FIGS. 1 and 2, this is only an example, and any number of modules may be used (e.g., more than 3, more than 4 or even more than 5 modules). Between 2 and 20 DEH modules may, for example, be used.

Figure 4:
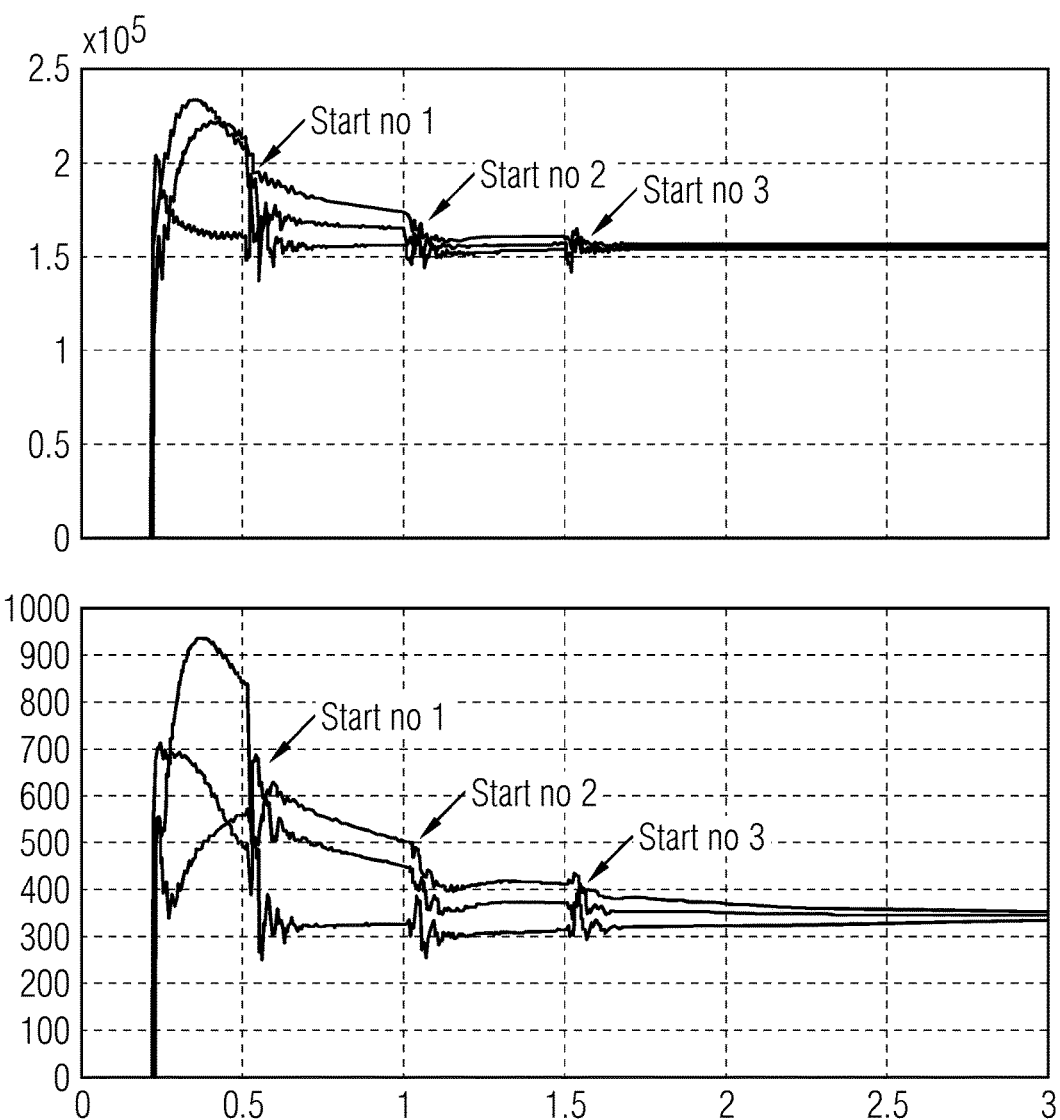
FIG. 4 is a diagram showing exemplary subsea power cable voltage and current for a DEH system in accordance with an embodiment.

FIG. 4 shows exemplary measurements taken on a DEH system similar to the one depicted in FIGS. 1 and 2. In the example, a distance of 30 km between neighboring feeder connection points is provided. The example does not use a topside compensation reactor. The upper curves show the subsea cable voltage, while the lower curves show the subsea cable current. The starting up of the first, the second and the third DEH modules is shown from the curves. After startup, the load is relatively well balanced on the three phases (e.g., the three curves in each diagram).

Figure 5:
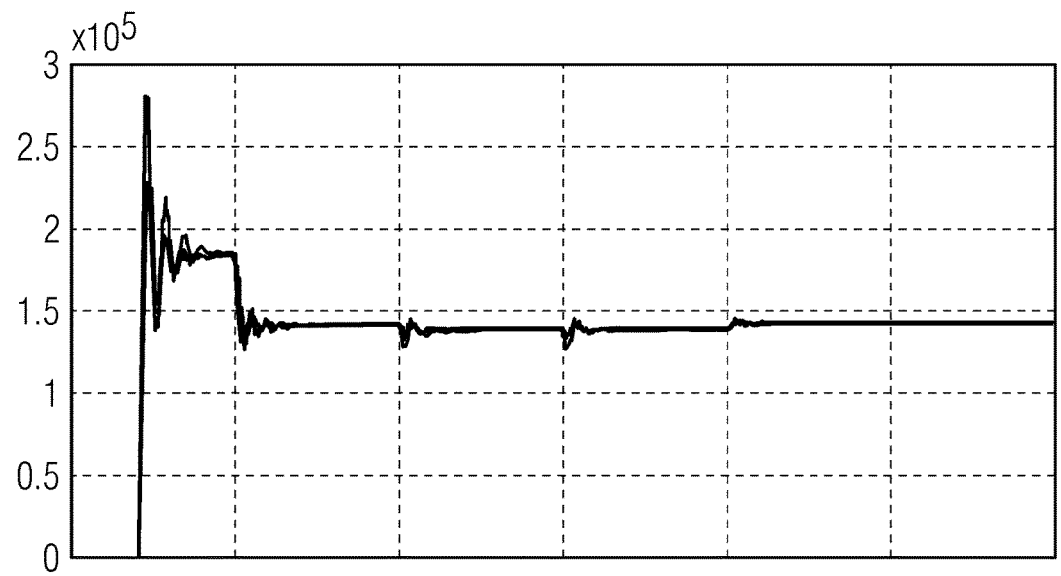
FIG. 5 is a diagram showing subsea power cable voltage and current for a DEH system in accordance with an embodiment that uses a topside compensation reactor for reducing reactive power.
Figure 5:
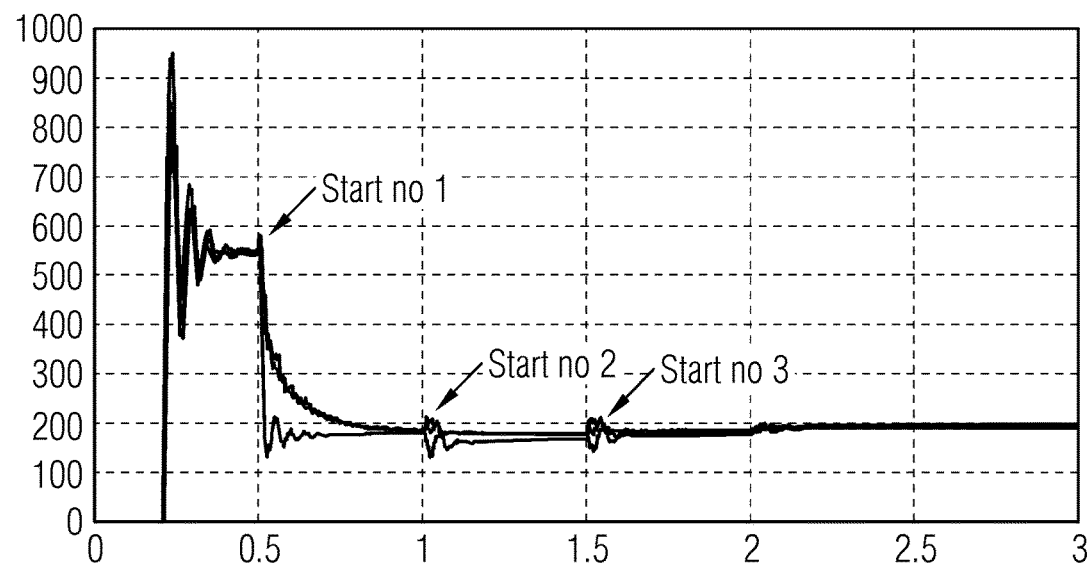

FIG. 5 shows exemplary measurements taken on a DEH system similar to the DEH system depicted in FIGS. 1 and 2. Different from the configuration of FIG. 4, a topside compensation reactor is employed. The step out distance is 100 km, and the distance between neighboring feeder connection points is 40 km. As shown, the curves for the three phases run substantially parallel, showing a good balancing of the load on the three phases and low currents due to reactive power. Again, the starting up of the three subsea DEH modules is visible in the curves.

FIGS. 4 and 5 show that with different configurations of the DEH system 100, a number of subsea DEH modules may be operated on a single subsea power cable, and a pipeline section being located a considerable distance away form the power source and having a considerable length may be heated.

While specific embodiments are disclosed herein, various changes and modifications may be maid without departing from the scope of the invention. The present embodiments are to be considered in all respect as illustrative and non-restrictive, and all changes coming within the meaning and equivalency range of the appended claims are intended to be embraced therein.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A direct electric heating system for heating a subsea pipeline, the direct electric heating system comprising:
   a subsea power cable adapted to be electrically coupled to a three phase electric power source for providing three phase electric power to a subsea location; and
   two or more subsea direct electric heating (DEH) modules, each subsea DEH module of the two or more subsea DEH modules adaptable for heating a different pipeline section of the subsea pipeline having a different pipeline length, the two or more subsea DEH modules being adapted to be installed subsea at different subsea locations,
   wherein each subsea DEH module of the two or more subsea DEH modules comprises:
   a three phase transformer;
   first electric connections adapted to electrically couple the three phase transformer of the subsea DEH module to the subsea power cable for supplying the three phase electric power to the three phase transformer;
   second electric connections adapted to electrically couple the subsea DEH module to the respective pipeline section for providing electric power to the pipeline section for heating the pipeline section;
   a symmetrisation unit coupled between the three phase transformer and the second electric connections, wherein the symmetrisation unit is adapted to distribute an electric load of the pipeline section evenly between the three phases of an output of the three phase transformer, so as to achieve a balanced three phase load on the three phase power source; and
   a compensation reactor adapted to compensate for reactive power arising from a capacitance of the subsea power cable.

2. The direct electric heating system of claim 1, wherein each subsea DEH module of the two or more subsea DEH modules is adapted to heat the respective pipeline section by single phase electric power, the pipeline section constituting a single phase load for the respective DEH module.

3. The direct electric heating system of claim 1, wherein the pipeline section is coupled between a first phase and a third phase of the output of the three phase transformer, and
   wherein the symmetrisation unit comprises a capacitance coupled between the first phase and a second phase of the output of the three phase transformer, and an inductance coupled between the second phase and the third phase of the output of the three phase transformer.

4. The direct electric heating system of claim 3, wherein the capacitance, the inductance, or the capacitance and the inductance are adjustable.

5. The direct electric heating system of claim 1, wherein the second electric connections comprise an electric connection from an output of the symmetrisation unit to one end of the respective pipeline section and an electric connection from the output of the symmetrisation unit to the other end of the respective pipeline section.

6. The direct electric heating system of claim 1, wherein the three phase transformer comprises an on-load tap changer, the three phase transformer being controllable for adjusting a level of the voltage supplied to the second electric connections based on pipeline length.

7. The direct electric heating system of claim 1, wherein the compensation reactor comprises a coil having an inductance, a value of the inductance being adjustable in accordance with a control signal based on a length of the subsea power cable.

8. The direct electric heating system of claim 1, wherein the subsea power cable is electrically coupled to the three phase power source at a topside installation, and
   wherein the direct electric heating system further comprises a topside three phase transformer at the topside installation, the topside three phase transformer being connected between the three phase power source and the subsea power cable for transforming a voltage supplied by the three phase power source to a higher voltage level.

9. The direct electric heating system of claim 1, wherein the subsea power cable is electrically coupled to the three phase power source at a topside installation, and
   wherein the direct electric heating system further comprises a topside variable frequency drive at the topside installation for adjusting a frequency, a voltage, or the frequency and the voltage of the three phase electric power supplied by the three phase power source.

10. The direct electric heating system of claim 1, wherein the subsea power cable comprises a three core cable, each core of the three core cable supplying a phase of the three phase electric power to the subsea location.

11. The direct electric heating system of claim 1, wherein the subsea DEH module further comprises a communication interface for communication with a topside installation, and
   wherein the transformer, the symmetrisation unit, or the transformer and the symmetrisation unit are controllable via the communication interface.

12. The direct electric heating system of claim 1, further comprising a controller for adjusting the symmetrisation unit for balancing a load on the three phase output of the three phase transformer automatically or in accordance with a received control signal.

13. The direct electric heating system of claim 1, wherein each subsea DEH module of the two or more subsea DEH modules comprises a subsea enclosure, the three phase transformer and the symmetrisation unit being arranged in the subsea enclosure.

14. The direct electric heating system of claim 11, wherein the transformer, the symmetrisation unit, or the transformer and the symmetrisation unit are controllable via control signals received from the topside installation on the communication interface.

15. The direct electric heating system of claim 2, wherein the pipeline section is coupled between a first phase and a third phase of the output of the three phase transformer, and
   wherein the symmetrisation unit comprises a capacitance coupled between the first phase and a second phase of the output of the three phase transformer, and an inductance coupled between the second phase and the third phase of the output of the three phase transformer.

16. A direct electric heating system for heating a subsea pipeline, the direct electric heating system comprising:
- a subsea power cable adapted to be electrically coupled to a three phase electric power source for providing three phase electric power to a subsea location; and
- two or more subsea direct electric heating (DEH) modules, each subsea DEH module of the two or more subsea DEH modules configured for individually adjusting heating of a different pipeline section of the subsea pipeline, the two or more subsea DEH modules being adapted to be installed subsea at different subsea locations, wherein each subsea DEH module of the two or more subsea DEH modules comprises:
- a three phase transformer;
- first electric connections adapted to electrically couple the three phase transformer of the subsea DEH module to the subsea power cable for supplying the three phase electric power to the three phase transformer;
- second electric connections adapted to electrically couple the subsea DEH module to the respective pipeline section for providing electric power to the pipeline section for heating the pipeline section;
- a symmetrisation unit coupled between the three phase transformer and the second electric connections, wherein the symmetrisation unit is adapted to distribute an electric load of the pipeline section evenly between the three phases of an output of the three phase transformer, so as to achieve a balanced three phase load on the three phase power source; and
- a three phase circuit breaker adapted to disconnect the subsea DEH module from the three phase power source.

17. The direct electric heating system of claim 16, wherein each subsea DEH module of the two or more subsea DEH modules comprise a compensation unit adapted to compensate for reactive power arising from heating of the respective pipeline section.

18. The direct electric heating system of claim 17, wherein the compensation unit comprises a capacitance value being controllable.

19. A direct electric heating system for heating a subsea pipeline, the direct electric heating system comprising:
- a subsea power cable adapted to be electrically coupled to a three phase electric power source for providing three phase electric power to a subsea location and to be electrically coupled to a three phase power source at a topside installation;
- a topside compensation reactor connected to the subsea power cable at the topside installation, the topside compensation reactor being adapted to compensate for reactive power arising from a capacitance of the subsea power cable; and
- two or more subsea direct electric heating (DEH) modules, each subsea DEH module of the two or more subsea DEH modules configured for individually adjusting heating of a different pipeline section of the subsea pipeline having a different pipeline length, the two or more subsea DEH modules being adapted to be installed subsea at different subsea locations, wherein each subsea DEH module of the two or more subsea DEH modules comprises:
- a three phase transformer;
- first electric connections adapted to electrically couple the three phase transformer of the subsea DEH module to the subsea power cable for supplying the three phase electric power to the three phase transformer;
- second electric connections adapted to electrically couple the subsea DEH module to the respective pipeline section for providing electric power to the pipeline section for heating the pipeline section; and
- a symmetrisation unit coupled between the three phase transformer and the second electric connections, wherein the symmetrisation unit is adapted to distribute an electric load of the pipeline section evenly between the three phases of an output of the three phase transformer, so as to achieve a balanced three phase load on the three phase power source.

* * * * *